Patented Sept. 3, 1929.

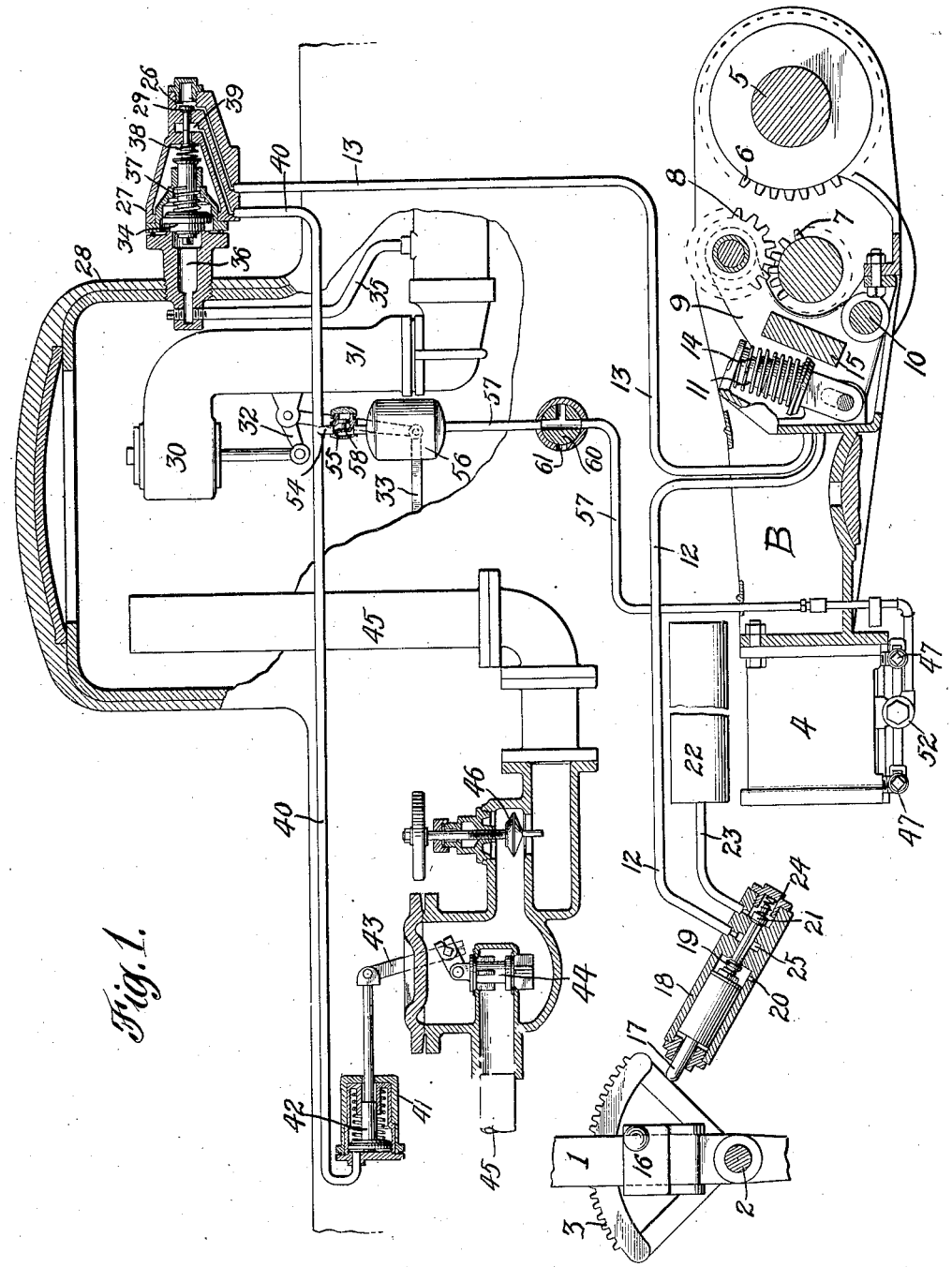

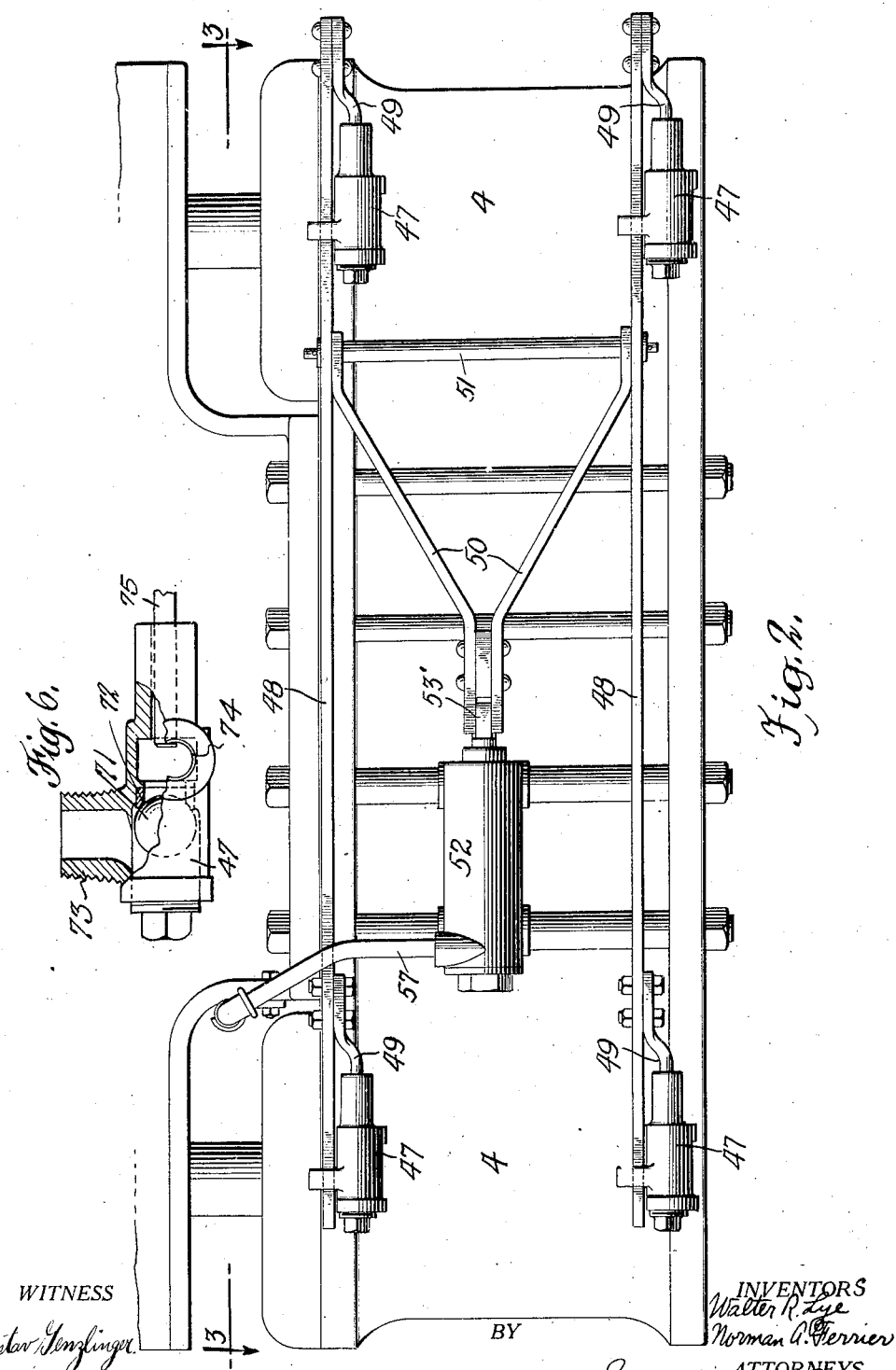

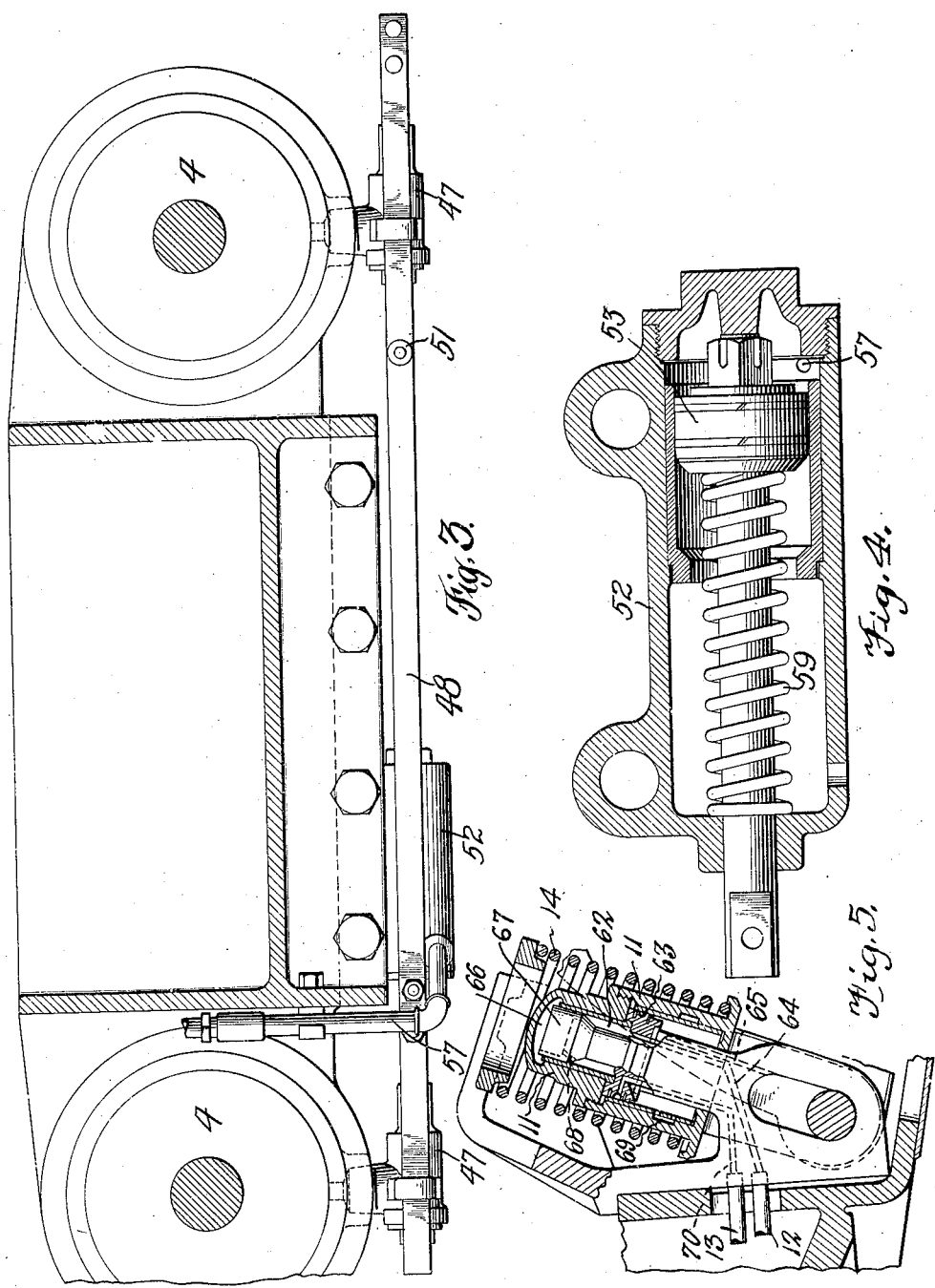

1,727,125

UNITED STATES PATENT OFFICE.

WALTER R. LYE, OF CLEVELAND, AND NORMAN A. FERRIER, OF LAKEWOOD, OHIO, ASSIGNORS TO FRANKLIN RAILWAY SUPPLY COMPANY, A CORPORATION OF DELAWARE.

LOCOMOTIVE BOOSTER-MOTOR EQUIPMENT.

Application filed September 13, 1922. Serial No. 587,868.

This invention relates in general to locomotive booster motors of the type which has been disclosed in patent to Howard L. Ingersoll, No. 1,339,395, issued May 11th, 1920 and it has particular reference to the provision of a novel equipment of cylinder cocks for the booster motor cylinders.

The principal object of the invention is the provision of controlling mechanism for the booster motor which will ensure thorough draining of the booster cylinders prior to the time that the cylinder cocks close so as to prevent knocking out of the cylinder heads. It is a further object of the invention to provide such an equipment which can be entirely automatic in its character and when automatic it is preferred to place the operation of the cylinder cocks under the control of the mechanism which operates the booster motor. We also propose to provide means for manually altering the functioning of the equipment should occasion demand as hereinafter described. These together with such other objects as are incident to our invention or may hereinafter appear we obtain by means of a booster motor equipment which is illustrated in preferred form in the accompanying drawings, wherein—

Fig. 1 is a diagrammatic layout illustrating the mechanism for controlling a locomotive booster motor which is equipped with our improvements; Fig. 2 is a bottom plan view on a greatly enlarged scale of the booster motor cylinders with the operating mechanism therefor; Fig. 3 is a section on the line 3—3 of Fig. 2; Fig. 4 is a longitudinal section through the operating cylinder for the cylinder cocks; Fig. 5 is an enlarged sectional view of the operating mechanism for entraining the booster; and Fig. 6 is a part sectional view of one of the cylinder cocks illustrating the manner in which it functions.

Booster motors of the type herein illustrated as is now well known in the art are intended to assist the main locomotive in starting and at slow speeds but they are not intended to drive the locomotive by themselves nor are they intended to be operated at high speeds. It is preferred to have them drive the wheels of a trailer truck although for the purposes of the present invention this is not at all necessary. For a thorough description of the control and operation of a booster motor of this character reference can be made to the above mentioned patent the statement below being simply a brief analysis such as will enable those skilled in the art to understand the invention herein.

Referring to the drawings and particularly to Fig. 1 it will be seen that we have partially illustrated the reverse lever 1 of a locomotive. This lever is pivoted at 2 to swing across the quadrant 3 in the manner well understood in the locomotive art. The diagrammatic illustration of the locomotive booster motor B shows a booster cylinder 4 and the axle 5 which it is intended to drive through the medium of the gear 6, pinion 7 and idler gear 8. The latter is mounted upon a rocking member 9 which is adapted to swing upon the pin 10 under the influence of an operating cylinder 11 to throw the idler gear into mesh with the gear 6, it being understood of course that the idler gear remains at all times in mesh with the pinion 7. Fluid pressure, preferably air, is supplied to the cylinder 11 through the pipe 12 and is conducted therefrom through the pipe 13 as will appear hereinafter. The booster motor is said to be "entrained" when the cylinder 11 is operated to throw the idler gear 8 into mesh with the gear 6. Disentrainment is accomplished by exhausting the fluid pressure from the cylinder 11 whereupon the spring 14 assisted by the counterweight 15 functions to return the rocking member 9 to the position illustrated in Fig. 1.

Before the booster motor however can be thrown into operation it is necessary for the engineman to throw the reverse lever 1 "into the corner" as it is colloquially expressed. In this position, which would be to the right in the showing of Fig. 1, the latch 16 which is carried by the reverse lever would engage the end of the plunger 17 in what is called the reverse lever pilot valve 18. When the plunger 17 is depressed valve 19 is seated and exhaust to the atmosphere through the opening 20 closed. At the same time valve 21 is opened which immediately establishes communication between the air reservoir 22 and the pipe 12 through the medium of the pipe 23 and chambers 24 and 25 in the reverse lever pilot valve 18. The cylinder 11 is then actuated to move the idler gear 8 into mesh with the gear 6 as already described, the pressure entering the chamber 62 above the stationary piston 63 through the duct 64 to which pipe 12 is connected. (See Fig. 5.) The cylinder 11 is provided with an exhaust port 65. The air passes from the chamber 62 into the space 66 above the smaller upper end 67 of the piston 63 through a port 68. The cylinder 11 is thus raised to entrain the idler gear 8 and when by-pass 69 comes to the top of the stroke it establishes communication between chamber 62 and duct 70, the latter communicating with pipe 13.

After the cylinder 11 has been moved to accomplish the foregoing the air pressure is established in pipe 13 which communicates with the chamber 26 at the right hand end of the throttle pilot and control valve 27 which is preferably secured to the side of the steam dome 28 of the locomotive. Here further progress of the air pressure is blocked by means of the valve 29.

Within the dome 28 we have illustrated the main locomotive throttle 30 at the beginning of the dry pipe 31. The main throttle 30 is controlled by means of the bell crank lever 32 and the rod 33 leading to the cab, not shown. After the reverse lever has been thrown into the corner and the main throttle 30 has been opened in the manner well understood in locomotive practice, the pressure of the live steam within the dry pipe 31 will be communicated to the left hand end of the piston 34 through the pipe 35 and chamber 36 whereupon the piston 34 will be moved to the right against the pressure of the springs 37 and 38 to unseat the valve 29. Air pressure will now flow from the pipe 13 and chamber 26 to the chamber 39 and pipe 40 the latter leading to the left hand end of what is called the booster throttle operating cylinder 41. The piston 42 in this cylinder will then be moved to the right to rock the bell crank lever 43, lift the booster throttle 44 and admit steam pressure from the dome through the booster dry pipe 45. The cylinders 4 of the booster motor will then operate to aid in the propulsion of the locomotive. The booster dry pipe 45 is provided with a hand wheel operated cut off valve 46 so that the supply of steam to the booster motor may be shut off by hand should it be desired to do so.

From the foregoing it will be seen that the booster motor will not be effective as a propelling power until after the main throttle has been moved to admit steam pressure to the main locomotive cylinders.

There is a cylinder cock 47 below and at each end of the booster cylinders 4 through which condensate can be drained from the cylinders. These cocks are connected together so as to function simultaneously by means of a framework comprising the longitudinal rods 48, the connecting links 49 and the connecting rod frame 50, the frame 50 being secured to the two rods 48 by means of a transverse member 51.

The cocks are normally in open position when the booster is not operating, the usual ball valve 71 being away from its seat 72 because of the absence of steam pressure in the cylinders to which the cocks are connected through the inlets 73. Discharge takes place through outlet port 74. (See Fig. 6.) By advancing the sliding rods 75 the balls can be held from their seats even after steam pressure enters the booster cylinders 4. In Fig. 6 the rod 75 is shown in its retracted position and the ball valve 71 is seated because of the steam pressure entering from a cylinder 4 through connection 73. The rods 75 are secured to the links 49 and are normally held against the balls 71 by the piston 53 of the operating cylinder 52, which piston is connected to the frame 50 at the joint 53'.

When the booster motor is to be put into operation it is necessary of course to shut the cylinder cocks 47 but it is desirable to leave them open during the first few strokes of the pistons in the cylinders 4 in order that all water of condensation may be drained off so as to prevent any possibility of knocking out the cylinder heads. It is also advisable that this be taken care of automatically inasmuch as the controlling mechanism for the booster motor is entirely automatic. To this end therefore we supply the opening 52 with operating fluid which is received through the pipe 40, the connection being made through the pipe 54, check valve 55, timing reservoir 56 and pipe 57. It will therefore be seen that the cylinder cocks will remain in open position until after the main locomotive has received steam and also until after the booster motor has been operating for a short interval of time. The cylinder 52 with its piston 53 constitute what might be termed a disabling means while the spring 59 and the parts which it actuates constitute a means normally holding the cocks in open position. The check valve 55 is provided with a restricted orifice 58 which together with the timing reservoir 56 causes the desired delay inasmuch as sufficient pressure must be built up to move the piston 53 against the spring 59. When the pressure is built up the piston 53 is moved against the spring 59 to permit closing of the ball valves 71.

We prefer to introduce a three way cock 60 in the pipe 57 which is placed within convenient reach of the engineer. By means of this cock he can hold open the cylinder cocks for a longer period than they would otherwise remain open, should occasion arise to make this desirable, or he can cause them to open at will at any time during the operation of the booster. In the position indicated in Fig. 1 normal functioning as first described herein would take place but if the valve were turned 90° clockwise pressure could be exhausted through the port 61 and the piston 53 would then move to open the cylinder cocks.

We claim:

1. A locomotive booster equipment including, in combination with an axle to be driven, a steam actuated booster motor, mechanism for connecting the said motor to and disconnecting it from said axle, a cylinder cock for the booster, means holding said cock in open position while the booster is disconnected from said axle, and means for disabling said holding means after the booster is connected to said axle.

2. A locomotive booster equipment including, in combination with the means for supplying the locomotive with steam, an axle to be driven, a steam actuated booster motor, mechanism for connecting said motor to and disconnecting it from said axle, a booster cylinder cock, means holding said cock in open position while the booster is disconnected from said axle, and means for disabling said holding means after the booster is connected to said axle and upon delivery of steam to the locomotive.

3. A locomotive booster equipment including, in combination with an axle to be driven, a steam actuated booster motor, mechanism for connecting said motor to and disconnecting it from said axle, a cylinder cock for the booster, means holding said cock in open position while the booster is disconnected from said axle, means for disabling said holding means after the booster is connected to said axle, and means for delaying the action of said disabling means.

4. A locomotive booster equipment including, in combination with the means for supplying the locomotive with steam, an axle to be driven, a steam actuated booster motor, mechanism for connecting said motor to and disconnecting it from said axle, a booster cylinder cock, means holding said cock in open position while the booster is disconnected from said axle, means for disabling said holding means after the booster is connected to said axle and upon delivery of steam to the locomotive, and means for delaying the action of said disabling means.

5. A locomotive booster equipment including, in combination with the means for supplying the locomotive with steam, an axle to be driven, a normally inoperative and disentrained steam-actuated booster motor, a fluid pressure actuated controlling system effective when the locomotive is receiving steam for causing booster entrainment and operation, a booster cylinder cock, means normally holding said cock in open position, a fluid pressure actuated means for disabling said holding means, and means for supplying said disabling means with fluid pressure from said controlling system.

6. A locomotive booster equipment including, in combination with the means for supplying the locomotive with steam, an axle to be driven, a normally inoperative and disentrained steam-actuated booster motor, a fluid pressure actuated controlling system effective when the locomotive is receiving steam for causing booster entrainment and operation, a booster cylinder cock, means normally holding said cock in open position, a fluid pressure actuated means for disabling said holding means, means for supplying said disabling means with fluid pressure from said controlling system, and means for exhausting said supply at will.

7. A locomotive booster equipment including, in combination with the means for supplying the locomotive with steam, an axle to be driven, a normally inoperative and disentrained steam-actuated booster motor, a fluid pressure actuated controlling system effective when the locomotive is receiving steam for causing booster entrainment and operation, a booster cylinder cock, means normally holding said cock in open position, a fluid pressure actuated means for disabling said holding means, means for supplying said disabling means with fluid pressure from said controlling system, and means for delaying the supply of fluid pressure to said disabling means.

8. A locomotive booster equipment including, in combination with the means for supplying the locomotive with steam, an axle to be driven, a normally inoperative and disentrained steam-actuated booster motor, a fluid pressure actuated controlling system effective when the locomotive is receiving steam for causing booster entrainment and operation, a booster cylinder cock, means normally holding said cock in open position, a fluid pressure actuated means for disabling said holding means, means for supplying said disabling means with fluid pressure from said controlling system, and a timing reservoir in said connection whereby to delay actuation of said disabling means.

In testimony whereof, we have hereunto signed our names.

WALTER R. LYE.
N. A. FERRIER.